United States Patent
Hasegawa et al.

(10) Patent No.: US 10,403,322 B2
(45) Date of Patent: Sep. 3, 2019

(54) MOVING A CAR WITHIN A SHUTTLE COMPLEX BASED UPON LIBRARY STRING DATA CHUNK COUNTS

(71) Applicant: INTERNATIONAL BUSINESS MACHINES CORPORATION, Armonk, NY (US)

(72) Inventors: Tohru Hasegawa, Tokyo (JP); Yuhko Hasegawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 199 days.

(21) Appl. No.: 15/358,600

(22) Filed: Nov. 22, 2016

(65) Prior Publication Data

US 2018/0141750 A1    May 24, 2018

(51) Int. Cl.
  *G11B 15/68* (2006.01)
(52) U.S. Cl.
  CPC ........ *G11B 15/689* (2013.01); *G11B 15/6835* (2013.01)
(58) Field of Classification Search
  CPC .................... G11B 15/6835; G11B 15/689
  USPC ....................................................... 360/92.1
  See application file for complete search history.

(56) References Cited

U.S. PATENT DOCUMENTS

| | | | |
|---|---|---|---|
| 7,076,327 B1 * | 7/2006 | Desai | ................... G06F 3/0613 700/213 |
| 8,321,379 B2 | 11/2012 | Chang et al. | |
| 8,781,621 B2 | 7/2014 | Hirata et al. | |
| 8,838,872 B2 | 9/2014 | Starr | |
| 8,868,866 B2 | 10/2014 | Hoelsaeter | |
| 9,256,370 B2 | 2/2016 | Hasegawa et al. | |
| 2010/0042247 A1 * | 2/2010 | Starr | ................ G05B 19/41865 700/214 |
| 2013/0110287 A1 * | 5/2013 | Thompson | ........... G11B 15/689 700/245 |
| 2013/0191588 A1 * | 7/2013 | Starr | ..................... G06F 3/0611 711/112 |

(Continued)

OTHER PUBLICATIONS

IBM United States Hardware Announcement, "IBM System Storage TS3500 Tape Library Connector and TS1140 Tape Drive support for the IBM TS3500 Tape Library," May 9, 2011.

(Continued)

*Primary Examiner* — Jefferson A Evans
(74) *Attorney, Agent, or Firm* — ZIP Group PLLC

(57) ABSTRACT

The present description is directed to moving a car within a shuttle connection that connects a first library string and a second library string contained in a shuttle complex. The shuttle complex determines a first library string data chunk count of a first library string, determines a second library string data chunk count of a second library string, and moves the car within the shuttle connection to the first library string if the first library string data chunk count is greater than the second library string data chunk count. A library string data chunk count is generally the sum of respective cartridge data chunk counts of each cartridge located within the library string. The library string data chunk count may be updated after a data chunk write to a cartridge located within the library string, may be updated after a cartridge is moved from the library string, and may be updated after a cartridge is moved to the library string.

7 Claims, 8 Drawing Sheets

(56) References Cited

U.S. PATENT DOCUMENTS

| | | |
|---|---|---|
| 2014/0030049 A1 | 1/2014 | Imai et al. |
| 2015/0032251 A1 | 1/2015 | Hasegawa et al. |
| 2015/0231783 A1* | 8/2015 | Miller ................... B25J 9/1602 |
| | | 700/214 |
| 2016/0257493 A1* | 9/2016 | Astigarraga ............. B65C 3/26 |
| 2017/0018287 A1* | 1/2017 | Adrian ................... G11B 17/22 |
| 2017/0126780 A1* | 5/2017 | Freitag ................. G06F 3/0604 |
| 2018/0139508 A1* | 5/2018 | Norin ................... H04N 21/222 |

OTHER PUBLICATIONS

Iliadis, I., et al., "Performance Evaluation of a Tape Library System," Research Report, May 25, 2016.

* cited by examiner

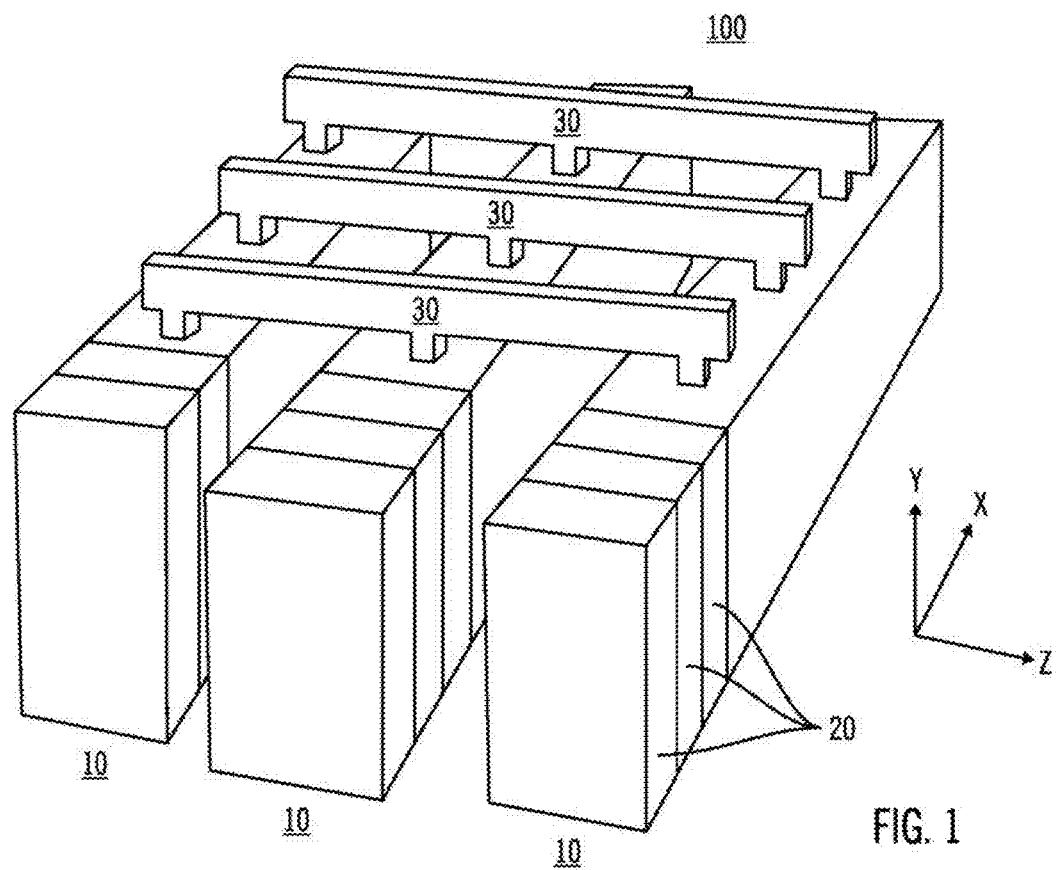

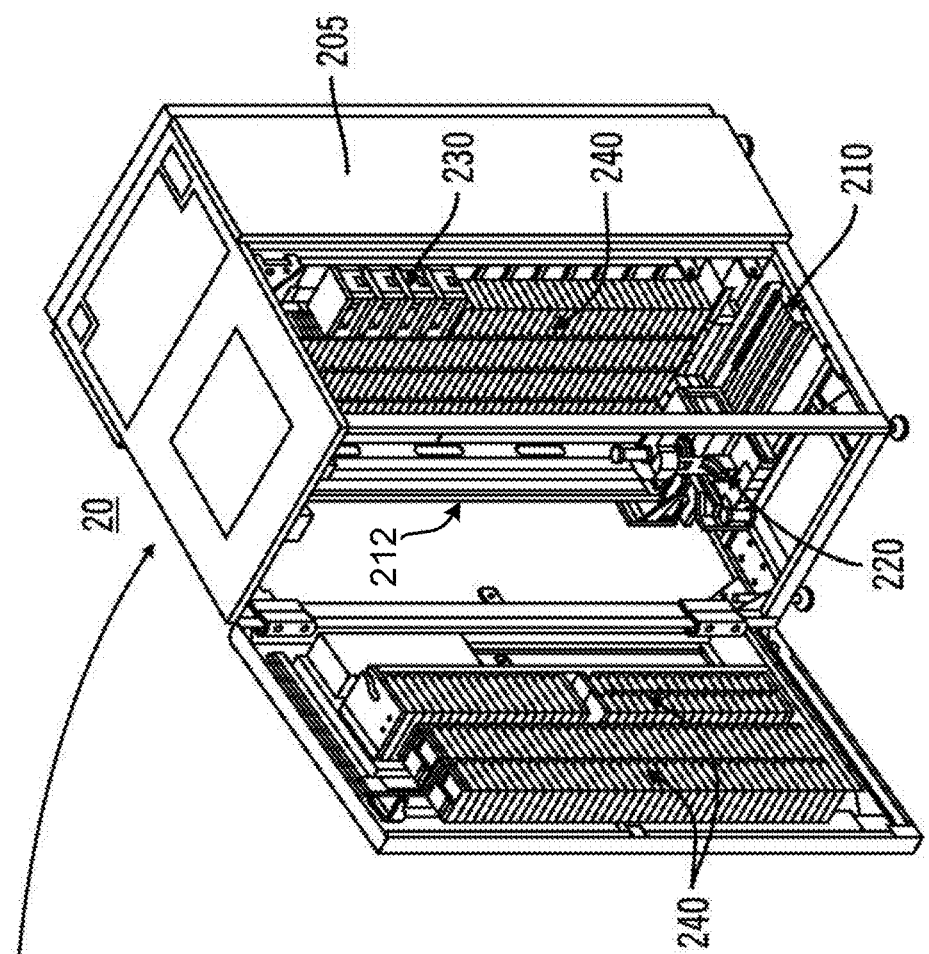
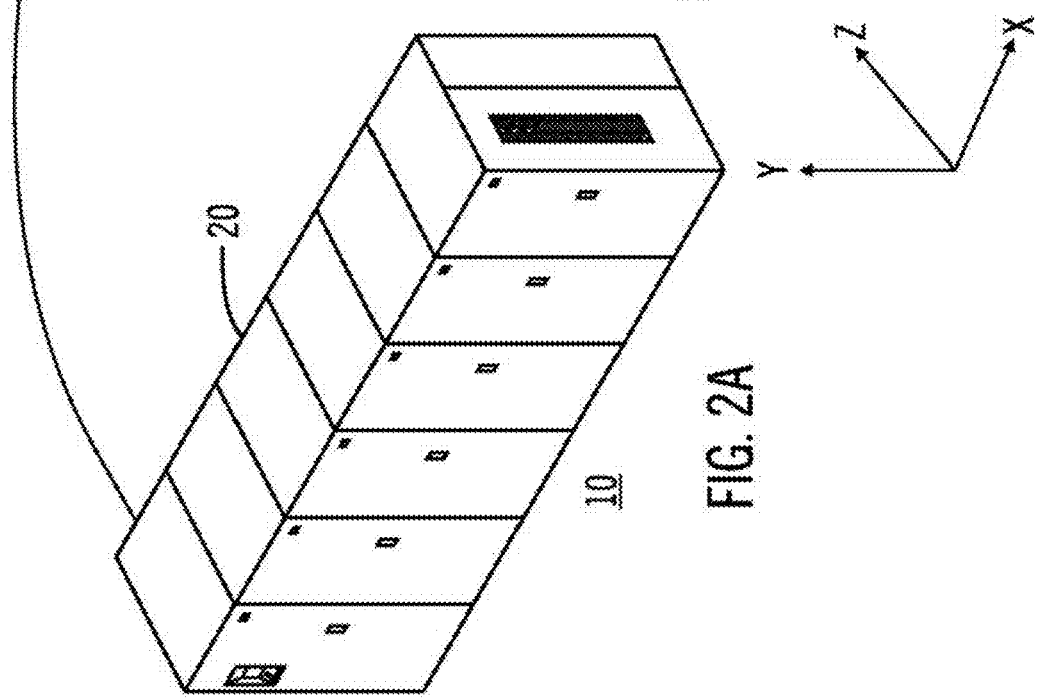
FIG. 2A
FIG. 2B

MOVING A CAR WITHIN A SHUTTLE COMPLEX BASED UPON LIBRARY STRING DATA CHUNK COUNTS

TECHNICAL FIELD

Embodiments of the present invention relate to moving a car within a shuttle complex.

BACKGROUND ART

A shuttle complex has been proposed for libraries in which a plurality of library strings connecting a plurality of libraries with storage media such as tapes are arranged in rows, and the library strings are connected by shuttle connections. This shuttle complex is already in practical use (IBM System Storage TS3500, etc.). In this shuttle complex, cars able to move within a shuttle connection move cartridges including storage media such as tapes between library strings, and the cartridges are mounted in a drive or housed in a slot within the library frame specified as the destination point.

In methods of the prior art for moving cartridges between library strings, when there is no car in the library string at the departure point, an available (empty) car has to be moved from the closest library string before the cartridge can be loaded into the car and moved to the library string at the destination point. Therefore, the time required to move cartridges between library strings is extended to include the movement of empty cars, and the amount of time required to move empty cars increases as both the traveling distances of cartridges and the number of traveling runs increases.

SUMMARY OF THE DESCRIPTION

In one embodiment of the present description, a method to move a car within a shuttle connection within a shuttle complex having a plurality of library strings is presented. The method includes determining a first library string data chunk count of a first library string, determining a second library string data chunk count of a second library string, and moving a car within a shuttle connection to the first library string if the first library string data chunk count is greater than the second library string data chunk count.

In another embodiment of the present invention, a computer program product for use with a shuttle complex is presented. The shuttle complex includes numerous shuttle connections, numerous library strings connected by at least one shuttle connection, and a processor. Each shuttle connection includes a car able to move within the shuttle connection. Each library string includes at least one cartridge. The processor includes a storage including program instructions that when executed by the processor, causes the shuttle complex to determine a first library string data chunk count of a first library string, determine a second library string data chunk count of a second library string, and move a car within a shuttle connection to the first library string if the first library string data chunk count is greater than the second library string data chunk count.

In another embodiment of the present invention, a system is presented. The system includes a shuttle complex which includes numerous shuttle connections, numerous library strings that are connected by at least one shuttle connection, and a processor. Each shuttle connection includes a car able to move within the shuttle connection and each library string includes at least one cartridge that has a storage medium. The processor includes a storage with program instructions, that when executed by the processor, causes the shuttle complex to determine a first library string data chunk count of a first library string, determine a second library string data chunk count of a second library string, and move a car to the first library string if the first library string data chunk count is greater than the second library string data chunk count.

BRIEF DESCRIPTION OF DRAWINGS

FIG. 1 is a diagram showing the external appearance of the shuttle complex according to one or more embodiments of the present invention.

FIG. 2A is a diagram showing exemplary library frames constituting a library string according to one or more embodiments of the present invention.

FIG. 2B is a diagram showing an exemplary library frame according to one or more embodiments of the present invention.

DETAILED DESCRIPTION

Figure 3:
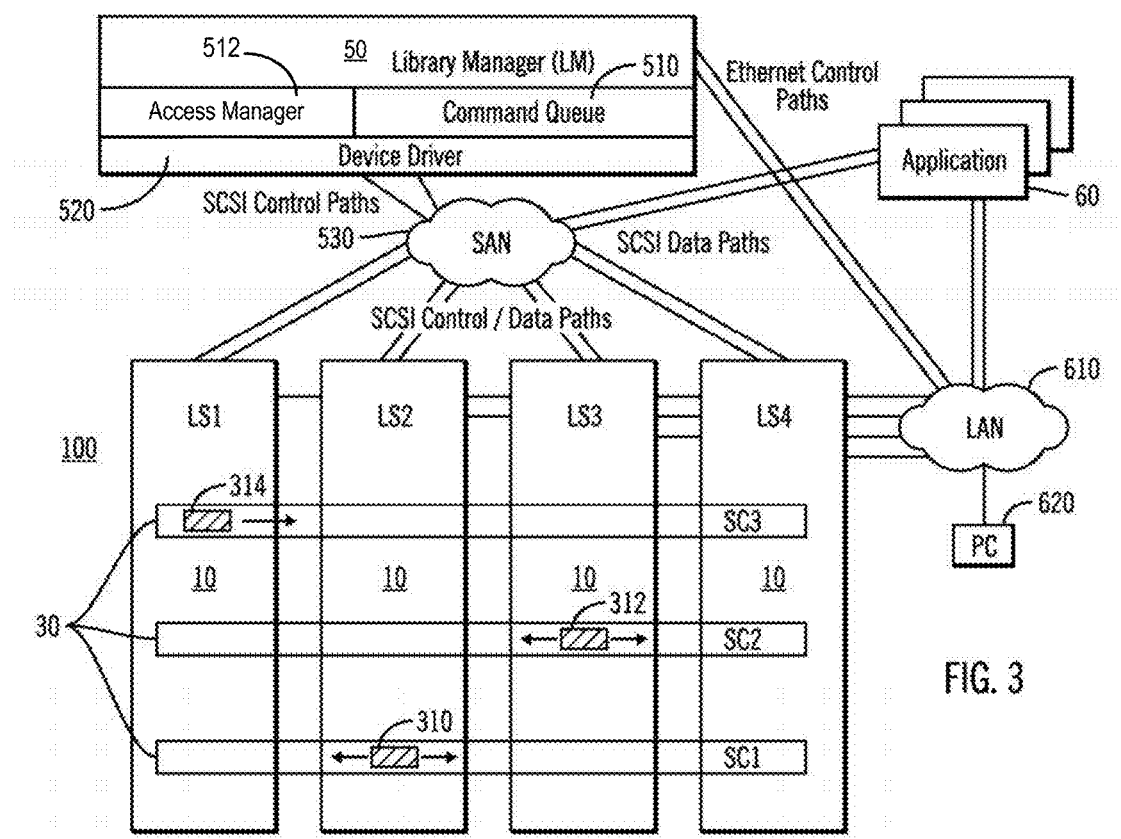
FIG. 3 is a diagram showing a configuration example of a system including a shuttle complex of embodiments of the present invention.

The following is a description of one or more embodiments of the present description with reference to the drawings. FIG. 1 is a diagram showing the external appearance of the shuttle complex 100. In FIG. 1, the shuttle complex 100 includes three library strings 10, and three shuttle connections 30 arranged on top of the three library strings 10. Each of the library strings 10 includes a plurality of library frames 20 connected in rows in the X direction.

The number of library strings 10 is not limited to three. Any number of library strings can be chosen. The number of shuttle connections 30 is also not limited to three. Any number can be chosen based on the length of the library strings 10 in the X direction. The length of the shuttle connections 30 in the Z direction can be extended as the number of library strings 10 is increased. Cars which move along rails are arranged inside the shuttle connections 30, and storage media, such as tape cartridges, are moved to and from different library strings 10.

FIG. 2A depicts an exemplary library string 10. The library string 10 includes six connected library frames 20. FIG. 2B depicts a single exemplary library frame 20. The library frame 20 includes, in a housing 205, a robotic arm 220 able to move over a rail 210 in the X direction and over a rail 212 in the Y direction, a plurality of drives 230 for mounting storage media, such as tape cartridges, to retrieve data, and a plurality of slots 240 able to accommodate storage media, herein referred to as cartridge(s).

The rail 210 in the X direction is connected to the rail inside the adjacent library frames 20, and the robotic arm 220 is able to move through multiple connected library frames 20. The robotic arm 220 can hold a cartridge, move at high speed along the rail, and mount the cartridge in the specified drive 230 or slot 240. Any number of drives 230 can be chosen and arranged according to the type of storage medium (magnetic tape, magneto-optical medium, etc.) and the type of cartridge (magnetic tape 3592, LTO, etc.).

FIG. 3 is a diagram showing a configuration example of a system including a shuttle complex 100 of the present invention. The shuttle complex 100 includes four library strings 10 (LS1-LS4). Three shuttle connections 30 (SC1-SC3) are connected to each library string. A car 310, 312, 314 is provided in each shuttle connection 30 which moves inside the shuttle connection. Each library string 10 and shuttle connection 30 is controlled by a library manager 50 via a storage area network (SAN) 530. The library strings 10 exchange (read/write) data with an application 60 via the SAN 530. The library strings 10 are also able to communicate with the application 60 and each terminal or personal computer (PC) 620 via a local area network (LAN) 610. The application 60 is dedicated software used to mount and unmounts cartridges to and from drives and exchange data therewith. An exemplary application 60 may be IBM Tivoli Storage Manager.

The library manager 50 is a single software package performing virtual central control of the drives 230 and cartridges between the application 60 and the shuttle complex 100 that enables access to each library frame 20. An example of a library manager 50 is a Linear Tape File System (LTFS), such as IBM Spectrum Archive Library Edition. The library manager 50 temporarily stores commands from the application 60 in a command queue 510, while controlling device drivers 520, and outputting, for example, a Small Computer System Interface (SCSI) command for each command to applicable library strings 10. The library manager 50 can also be a single software package or single appliance outside of the library, as shown in the drawing, or firmware inside the library.

In an embodiment, application 60 may write to or read from shuttle complex directly. In this embodiment, library manager 50 may be limited to the associated functionality of moving and mounting cartridges, as disclosed herein and application 60 implement the associated functionality of writing to or reading from the shuttle complex 100, as disclosed herein. For example, application 60 may be Tivoli Storage Manager, offered by International Business Machines Corporation and library manager 50 may be IBM Tape System Library Manager, offered by International Business Machines Corporation. In this embodiment, application 60 and/or library manger 50 may communicate to shuttle complex 100 via appropriate protocols (e.g., SCSI, etc.).

In an alternative embodiment, application 60 may write to or read from shuttle complex 100 indirectly through library manager 50. For example, in this embodiment the library manager 50 may be the Linear Tape File System (LTFS) and the application 60 is located e.g., upon a computer 620 that writes to or read from shuttle complex 100 indirectly through the library manager 50. In this embodiment, application 60 may communicate to the library manager 50 via appropriate protocols (e.g., LAN, Network Attached Storage, etc.) and the library manager 50 may communicate to shuttle complex 100 via appropriate protocols (e.g SCSI, etc.).

Library manager 50 may include an access manager 512. Access manager 512 is a software package that generally tracks the access activity of each cartridge within one or more shuttle complexes 100. More specifically, access manager 512 tracks the number of data chunks stored upon each cartridge within each shuttle complex under management, as is herein referred to as cartridge data chunk counts. Each cartridge is associated with its own cartridge data chunk count. As such, the cartridge data chunk count is effectively a dynamic property of a cartridge. Similarly, access manager 512 tracks the number of the data chunks stored upon each cartridge within each particular library string under management, as is herein referred to as library string data chunk counts. Each library string 10 is associated with its own library string data chunk count. As such, the library string data chunk count is effectively a dynamic property of a library string 10.

In embodiments, library manager 50 may further track which particular cartridges are located within each shuttle complex 100, which particular cartridges are located within each library string 10 of the shuttle complex 100, which particular cartridges are located within each library frame 20 of the library strings 10, which particular cartridge is located in a drive 230 or slot 240 within each library frame 20, which particular cartridge is located within a particular car, which movement source string a particular cartridge/car has departed from, which movement destination a particular cartridge/car will be arriving to, which library string each particular car is located, or the like.

In a configuration incorporating a library manager 50, the application 60 need only issue a request to library manager 50 when shuttle complex 100 is implicated, and the library manager 50 can manage and allocate the actual cartridges within the shuttle complex 100. In this way, it is easier to share cartridges in the shuttle complex 100 and, because the library manager 50 manages all operations, each application 60 does not have to be aware of the changes each and every time the cartridge configuration of the shuttle complex 100 is altered.

With regard to the movement of a cartridge within shuttle complex 100, in order to move the cartridge within a first library frame 20 to a drive 230 or slot 240 (in the X/Y-axis direction) within the first library frame 20, library manager 50 may issue a SCSI Move Medium command to move the cartridge in a conventional manner. Movement of this cartridge may be performed by robotic arm 220 and the movement speed is relatively fast. In contrast, in order to move (in the Z-axis direction) the cartridge that located in first library frame 20 to a drive 230 or slot 240 of a different second library frame 20 through a shuttle connection 30, more complex options are undertaken and the movement speed is relative slow. The library string 10 that is the movement source of the cartridge and the library string 10 that is the movement destination of the cartridge are described as "movement source string," and "movement destination string," respectively.

Exemplary operations to move (in the Z-axis direction) the cartridge that located in the movement source string to the movement destination string may begin with library manager 50 enumerating all available cars from among all shuttle connections 30 that connect the movement source string and the movement destination string. If there are no cars at the movement source string, library manager 50 may issue a Position to Element command to a car that is nearest the movement source string, to move that car to the movement source string (movement in Z-axis direction).

Library manager 50 may poll the movement source sting and/or the relevant car to confirm the car arrived at the movement source string. Upon detecting that the car arrived at the movement source string, library manager 50 may temporality lock the car so to not allow other car movement operations to proceed until the car delivers the cartridge and is unlocked so as to be available for other cartridge movement operations. The robotic arm 220 associated with the movement source string moves to a particular slot 240 that houses an applicable cartridge, captures the cartridge, moves the captured cartridge to the car, places the cartridge within the car, and moves away from the car to allow the car to move in the Z-axis within shuttle connection 30. For example, library manager 50 issues a Move Media command to robotic arm 220 of the movement source string to move the cartridge from slot 240 to the car (movement in X/Y-axis direction).

Library manager 50 issues an instruction to the car that which houses the cartridge which causes the car to move from the movement source string to the movement destination string (movement in the Z-axis direction). Library manager 50 may poll the destination source sting and/or the relevant car to confirm the car arrived at the destination source string.

The robotic arm 220 associated with the destination source string captures the cartridge, moves the captured cartridge to drive 230, mounts the cartridge within drive 230, and moves away from the drive 230. For example, library manager 50 issues a Move Media command to robotic arm 220 of the movement destination string to move the cartridge from the car to drive 230 (movement in X/Y-axis direction). Library manager 50 may subsequently unlock the car so as to allow the car to be available for further Z-axis cartridge movement operations.

The following is an exemplary implementation of a cartridge moving method of the present invention using the system configuration shown in FIG. 3. First, library manager 50 receives remote mounting command 1 (LS1→LS3) and remote mounting command 2 (LS3→LS1) as commands from application 60, and these commands are placed in the command queue 510. The commands in the command queue 510 may be executed in the order received, so remote mounting command 2 (LS3→LS1) may be executed after remote mounting command 1 (LS1→LS3) has been executed. However, commands in the command queue 510 may be executed simultaneously if cars are available to complete the operations.

Car 1 (310), car 2 (312) and car 3 (314) in respective shuttle connections 30 are positioned, respectively, in LS2, LS3 and LS1 among the library strings 10. The drives 230 are the plurality of drives in each library string 10 and, more specifically, in each library frame 20 of the library string 10.

An available car is searched out in all shuttle connections 30 connecting library strings LS1 and LS3. As a result, car 2 (312) and car 3 (314) are found. The library manager 50 scans the command queue 510 in the order commands were received, and determines whether or not there is a remote mounting command to LS1 which is the departure point and to LS3 with is the departure point. As a result, it finds remote mounting command 1 (LS1→LS3) and remote mounting command 2 (LS3→LS1).

Car 3 (314) is selected, and remote mounting command 1 (LS1→LS3) is executed. In other words, a cartridge CA in LS1 is moved into car 3 (314) (operation S1), and the car 3 (314) carrying the cartridge CA is moved to LS3 (operation S2). When the arrival of car 3 (314) at LS3 is detected, the cartridge CA is moved from car 3 to the specified drive DA (operation S3).

With regard to remote mounting command 2 (LS3→LS1), because car 2 (312) is available (i.e., it is not implicated in remote mounting command 1 (LS1→LS3)), remote mounting command 2 may be executed simultaneous with remote mounting command 1 (LS1→LS3). As such, the specified cartridge CB is moved into car 2 (operation S4), and the car 2 (312) carrying cartridge CB is moved to LS1 (operation S5). When the arrival of car 2 (312) at LS1 is detected, the cartridge CB is moved from car 2 (312) to the specified drive DB (operation S6). Such simultaneous operations can eliminate (or reduce) empty cars traveling between library strings.

The average time required to mount a cartridge in a drive 230 or slot 240 within a library string 10 and between library strings is 8.6 seconds and 37.6 seconds, respectively. In the case of the latter, cars need to travel between library strings 10, so the time required to move a car between library strings is (37.6−(8.6×2))/2=10.2 seconds.

Upon the cartridge being mounted to drive 230, drive 230 may access the mounted cartridge (i.e. read one or more data chunk(s) from storage media of the mounted cartridge and/or write one or more data chunk(s) to the storage media of the cartridge). As such, the term "mounted" is defined herein to be the state in which the cartridge is positioned within a drive such that the drive may read from and/or write to storage media of the cartridge. For example, library manager 50 may issue an access command to the drive to read a data chunk from the cartridge, write a data chunk to the cartridge, or the like. The term "data chunk" is defined herein to be a logical package of data that is stored upon the storage media of the cartridge. A data chunk may therefore be a block, file, page, or the like.

When the drive completes the cartridge access, the cartridge may not immediately dismounted from the drive. Rather, the cartridge is kept in a mounted state within the drive, and if an access of a different cartridge should occur, a different drive is used to mount and access the relevant cartridge. Such a scheme may be beneficial since it has been determined that there is a high probability of successive accesses of a cartridge.

Therefore, when mounting a cartridge, if an unused drive exists within the same library string as the cartridge (i.e. a drive that which no cartridges are mounted thereto), the unused drive may be utilized to mount the cartridge. However, in situations where a drive is selected to mount the cartridge which requires moving the cartridge from the movement source string to the movement destination string, it would be beneficial for a car to presently be located at the movement source string so as to reduce the time necessary to move and mount the cartridge. For example, a drive selection methodology carried out by library manager 50 selects a particular drive 230 within shuttle complex 100 to which to mount a particular cartridge requires moving the cartridge from the movement source string to the movement destination string. In embodiments of the present invention, therefore, a car placement methodology increases the probability of a car being located at the movement source string so as to reduce the time necessary to move and mount the cartridge.

Such car placement methodology may be utilized by library manager 50 to control the placement of cars within the shuttle complex so as to locate a car at one or more respective library strings that have the highest library string data chunk counts. Because these one or more library strings have the most data chucks that may be implicated by access read requests, and because read access requests may be random and are more predominate to write access requests, there is a high likelihood of read access requests implicating these library strings. In a situation where a drive is unavailable within these library strings, it becomes beneficial to move such cartridge to a movement destination string, and by having the car located at these library strings, the overall time needed to move and mount the cartridge is reduced.

Figure 4:
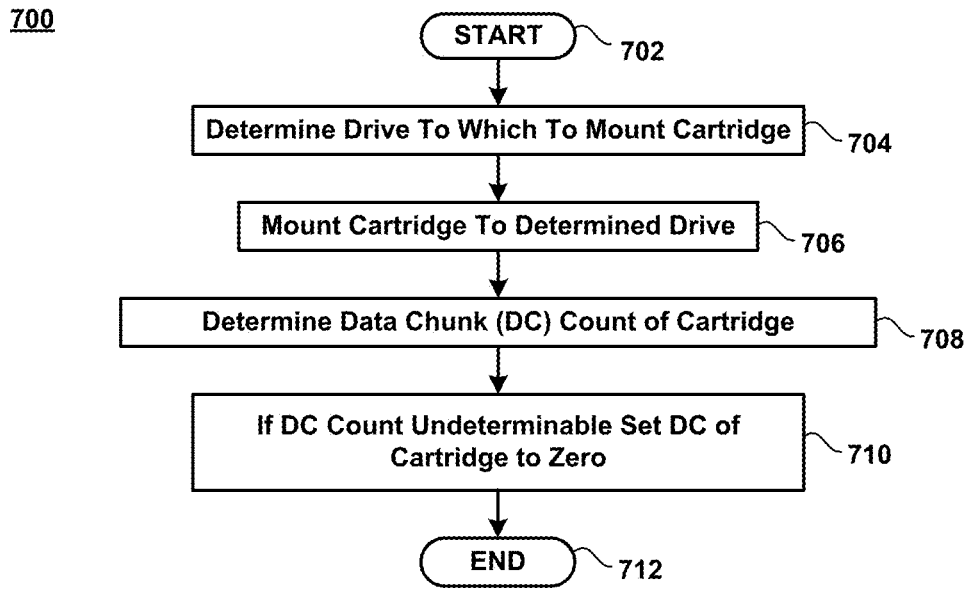
FIG. 4 is a diagram an exemplary method of determining a cartridge data chunk count of a cartridge recently mounted to a drive according to one or more embodiments of the present invention.

FIG. 4 is a diagram an exemplary method 700 of determining a cartridge data chunk count of a cartridge recently mounted to a drive 230, according to one or more embodiments of the present invention. Method 700 may be utilized by a processor that evokes program instructions stored in a memory to cause the processor to perform the indicated functionality to determine the cartridge data chunk count of the cartridge recently mounted to the drive 230 within a shuttle complex 100. Method 700 begins at block 702 and continues with determining a particular drive 230 to which mount a particular cartridge that is implicated in an access request (block 704). For example, library manager 50 may receive an access request from application 60 that implicates the particular cartridge, which may be referred herein as the access-cartridge. The library manger 50 may determine an available drive 230 within shuttle complex 100 to access the access-cartridge. The drive 230 may be located in the same library string 10 as the particular cartridge or located in a different library string 10 as the particular cartridge.

Method 700 may continue with mounting the cartridge to the drive 230 (block 706). For example, library manger 50 may issue commands to shuttle complex 100 to move (if needed) and mount the access-cartridge to the particular drive 230. Such movement may utilize of one or more robotic arms 20 and one or more associated library strings 10.

Method 700 may continue with determining a current data chunk count of the particular cartridge (block 708). For example, access manager 512 may query one or more data structures stored in at least one storage device (such as memory 802, storage device 825, the cartridge itself, see FIG. 10, or the like) accessible to library manager 50 that indicate the current data chunk count of the particular cartridge to effectively determine the current data chunk count of the particular cartridge. Such determination may occur prior or subsequent to the mounting of the cartridge to the drive 230. In a particular embodiment, library manger 50 may read an index from the cartridge that at least specifies the number of data chunks written to the cartridge.

Method 700 may continue with setting the current data chunk count of the particular cartridge to zero if the current data chunk count of the particular cartridge is not found or is undeterminable (block 710). For example, if no data structures exists within any of the storage devices accessible to access manager 512 that indicate the current data chunk count of the particular cartridge, access manager 512 may write a data structure within one or more storage devices that indicates the current data chunk count of the cartridge is zero. As such, an initial cartridge data chunk count may be set to zero prior to any data chunks being written to each respective cartridge within shuttle complex 100. Method 700 may end at block 712.

Figure 5:
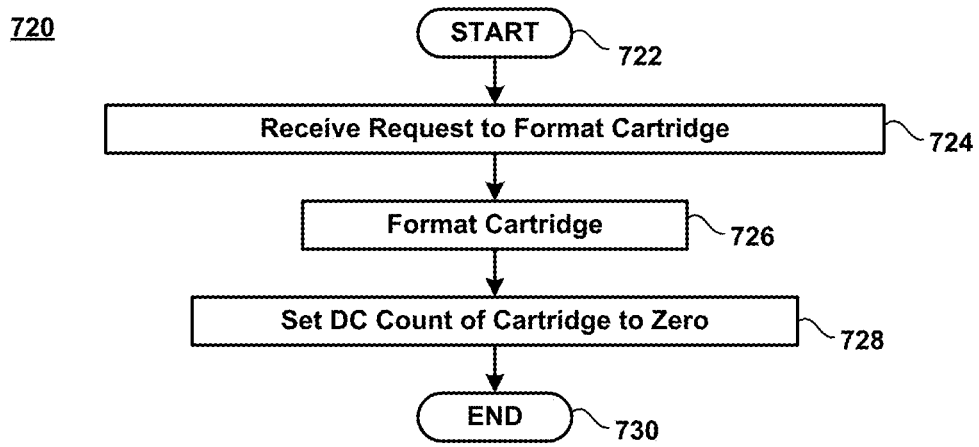
FIG. 5 is a diagram an exemplary method of setting a cartridge data chunk count of a recently formatted cartridge according to one or more embodiments of the present invention.

FIG. 5 is a diagram an exemplary method 720 of setting a cartridge data chunk count of a recently formatted cartridge, according to one or more embodiments of the present invention. Method 720 may be utilized by a processor that evokes program instructions stored in a memory to cause the processor to perform the indicated functionality to set a cartridge data chunk count of a recently formatted cartridge within a shuttle complex 100. Method 720 begins at block 722 with receiving a request to format a cartridge (block 724). For example, library manager 50 may receive a format request from application 60 to format a cartridge within shuttle complex 100. The library manger 50 may determine an available drive 230 within shuttle complex 100 to mount the cartridge. The drive 230 may be located in the same library string 10 as the cartridge or located in a different library string 10 as the cartridge. The library manger 50 may further issue commands to shuttle complex 100 to move (if needed) and mount the cartridge to the drive 230.

Method 720 may continue with the drive 230 formatting the cartridge (block 726). For example, the library manger 50 may issue commands to drive 230 to format the cartridge mounted therein. Due to formatting the cartridge, data chunks that may have been previously written to the cartridge are effectively erased from the cartridge. As such, method 720 may continue with resetting the cartridge data chunk count of the cartridge to zero (block 728). For example, access manager 512 may write a data structure within one or more storage devices accessible to access manager 512 that indicates the current data chunk count of the cartridge is zero. As such, an initial cartridge data chunk count may be set to zero prior to any data chunks being written to each respective cartridge within shuttle complex 100. Method 720 may end at block 730.

Figure 6:
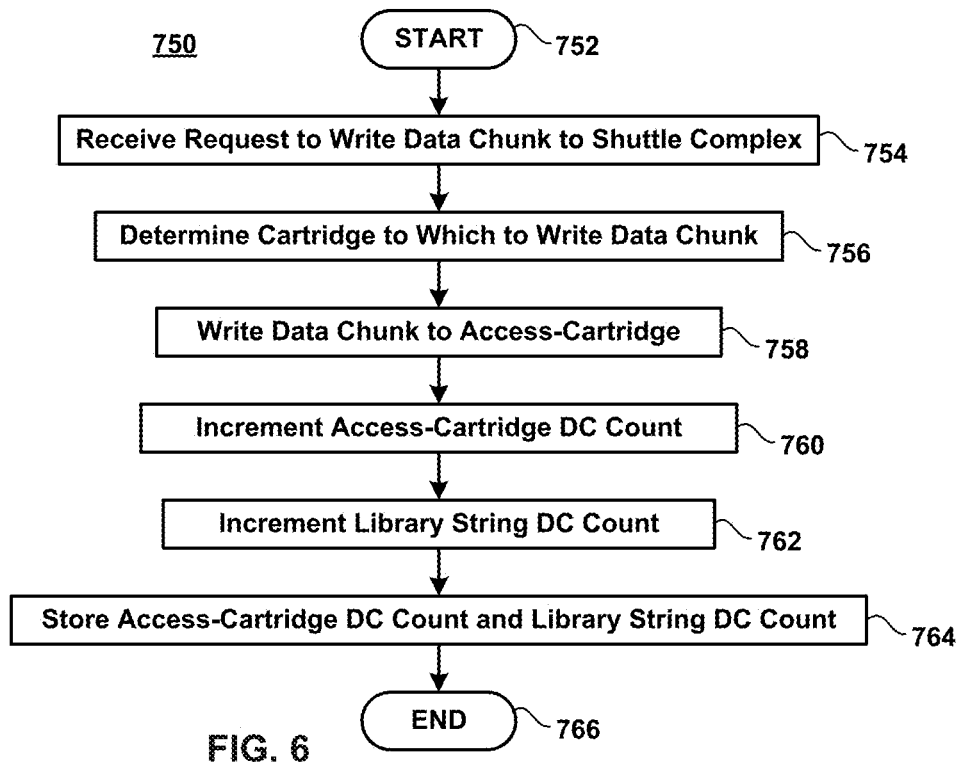
FIG. 6 is a diagram an exemplary method of incrementing a cartridge data chunk count and incrementing a library string data chunk count according to one or more embodiments of the present invention.

FIG. 6 is a diagram an exemplary method 750 of incrementing a cartridge data chunk count and incrementing a library string data chunk count, according to one or more embodiments of the present invention. Method 750 may be utilized by a processor that evokes program instructions stored in a memory to cause the processor to perform the indicated functionality to increment a cartridge data chunk count and library string data chunk count.

Method 750 begins at block 752 with receiving a write request to write to an access-cartridge (block 754). For example, library manager 50 may receive a write request from application 60. The write request includes a data chunk that is to be written and may further include one or more logical addresses which may or may not identify a particular cartridge.

Method 750 may continue by determining whether a particular cartridge is implicated by the write request, and if not, identifying a particular cartridge to which to write the data chunk (block 756). For example, library manager 50 may query a data structure that associates respective logical addresses to respective physical identifiers to determine if a physical identifier of a particular cartridge has been previously mapped to the logical address included in the write request. If the write request does not implicate any particular cartridge (e.g., the mapping of a cartridge physical identifier to logical address is not present), library manager 50 may choose a particular cartridge within shuttle complex 100 and associate the physical identifier of the chosen cartridge with the logical address of the write request, thereby creating or augmenting the data structure that associates respective logical addresses with respective physical identifiers of each cartridge. Such physical identifier is herein contemplated as a property of each cartridge and, like the cartridge data chunk count, moves with the cartridge if the cartridge moves to a new library string 10. As a result of block 756, a particular access-cartridge is identified to which to write the data chuck of the write request.

Method 750 may continue with writing the data chunk to the assess-cartridge (block 758). For example, library manager 50 caches or otherwise obtains the data chunk from the write request and writes the data chunk to the access-cartridge within shuttle complex 100. The writing of the data chunk may require the library manager 50 determining a drive 230 within the shuttle complex 100 to mount the access-cartridge if the access-cartridge is not presently mounted to a drive 230. The writing of the data chunk may further require library manager 50 issuing a command to move the access-cartridge from a movement source sting to a movement destination string.

Method 750 may continue with incrementing the cartridge data chunk count of the access-cartridge (block 760). For example, access manager 512 may identify the access-cartridge within a cartridge data chunk data structure and increase an entry of the cartridge data chunk data structure that counts the number of data chunks written to the access-cartridge.

Method 750 may continue with incrementing the library string data chunk count of the library string 10 which contains the access-cartridge (block 762). For example, access manager 512 may identify the library string 10 that which the access-cartridge was or is located when the data chunk was written thereto and identify the library string 10 within a library string data chunk data structure and increase an entry of the library string data chunk data structure that counts the overall number of data chunks written to cartridges within the library string 10.

Method 750 may continue with storing the new cartridge data chunk count and the new library string data chunk count within a storage device (block 764). For example, access manager 512 may store the cartridge data chunk data structure and the library string data chunk data structure to memory 802 (see FIG. 10), storage device 825 (see FIG. 10), and/or to the access-cartridge. In a particular implementation, access manager 512 may store the cartridge data chunk data structure as an index to the access-cartridge and may store the library string data chunk data structure in a storage device accessible to access manager 512. That is, there may be one library string data chunk data structure for each library string within complex 100 and there may be one cartridge data chunk data structure for each cartridge. If access manager 512 stores such data structure(s) to memory 802, the data structures may be occasionally stored within a non-volatile storage device, such as storage device 825.

As such, method 750 effectively creates and maintains a first data structure that tracks and updates respective cartridge data chunk counts for each cartridge within shuttle complex 100. Likewise, method 750 effectively creates and maintains a second data structure that tracks and updates respective library string data chunk counts for each library string 10 within shuttle complex 100. Method 750 may end at block 766.

Figure 7:
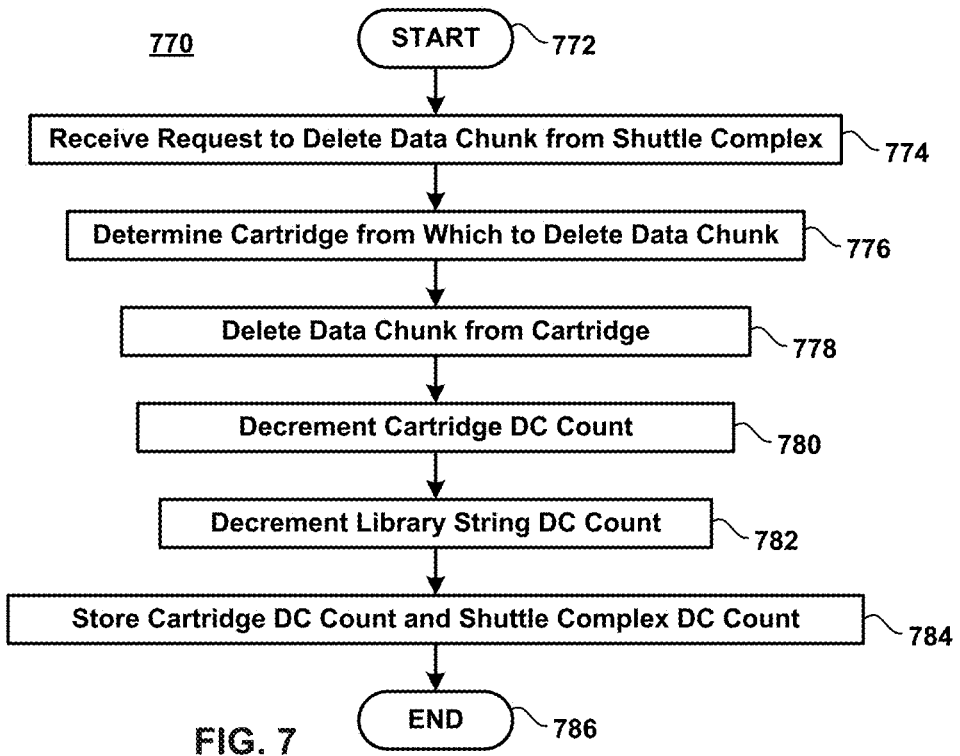
FIG. 7 is a diagram an exemplary method of decrementing a cartridge data chunk count and decrementing a library string data chunk count according to one or more embodiments of the present invention.

FIG. 7 is a diagram an exemplary method 770 of decrementing a cartridge data chunk count and decrementing a library string data chunk count, according to one or more embodiments of the present invention. Method 770 may be utilized by a processor that evokes program instructions stored in a memory to cause the processor to perform the indicated functionality to decrement the cartridge data chunk count and library string data chunk count.

Method 770 begins at block 772 with receiving a delete request to delete or otherwise remove a data chunk from a cartridge (block 774). For example, library manager 50 may receive a delete request from application 60. The delete request may include one or more logical addresses that identifies a particular cartridge.

Method 770 may continue by determining which cartridge is implicated by the delete request (block 776). For example, library manger 50 may query a data structure that associates respective logical addresses to respective physical identifiers to determine if a physical identifier of a particular cartridge has been previously mapped to the logical address included in the delete request. Method 770 may continue with deleting the data chunk from the cartridge (block 778). For example, library manager 50 may overwrite the data chunk, nullify the data chunk, or generally functionally remove the data chunk from the cartridge such that the data chunk is no longer returnable from library manager 50 to application 60. In a particular implementation, library manager 50 may remove appropriate metadata from the cartridge data chunk data structure to effectively functionally remove the data chunk from the cartridge such that the data chunk is no longer returnable from library manager 50 to application 60. The deleting of the data chunk may require the library manager 50 determine a drive 230 within the shuttle complex 100 to mount the cartridge if the cartridge is not presently mounted to a drive 230. The deleting of the data chunk may further require library manager 50 to issue a command to move the cartridge from a movement source sting to a movement destination string.

Method 770 may continue with decrementing the cartridge data chunk count of the cartridge (block 780). For example, access manager 512 may identify the cartridge within a cartridge data chunk data structure and decrease an entry of the cartridge data chunk data structure that counts the number of data chunks written to the cartridge that is identified by the delete request. Method 770 may continue with decrementing the library string data chunk count of the library string 10 that which contains the cartridge (block 782). For example, access manager 512 may identify the library string 10 that which the cartridge was or is located when the data chunk was deleted therefrom and identify the library string 10 within a library string data chunk data structure and decrease an entry of the library string data chunk data structure that counts the overall number of data chunks written to cartridges located within the library string 10.

Method 770 may continue with storing the new cartridge data chunk count and the new library string data chunk count within a storage device (block 784). For example, access manager 512 may store the cartridge data chunk data structure and the library string data chunk data structure to memory 802 (see FIG. 10), storage device 825 (see FIG. 10), and/or to the cartridge. In a particular implementation, access manager 512 may store the cartridge data chunk data structure as an index to the cartridge. If access manager 512 stores such data structure(s) to memory 802, the data structures may be occasionally stored within a non-volatile storage device, such as storage device 825.

As such, method 770 effectively creates and maintains a first data structure that tracks and updates respective cartridge data chunk counts for each cartridge within shuttle complex 100. Likewise, method 770 effectively creates and maintains a second data structure that tracks and updates respective library string data chunk counts for each library string 10 within shuttle complex 100. Method 770 may end at block 786.

Figure 8:
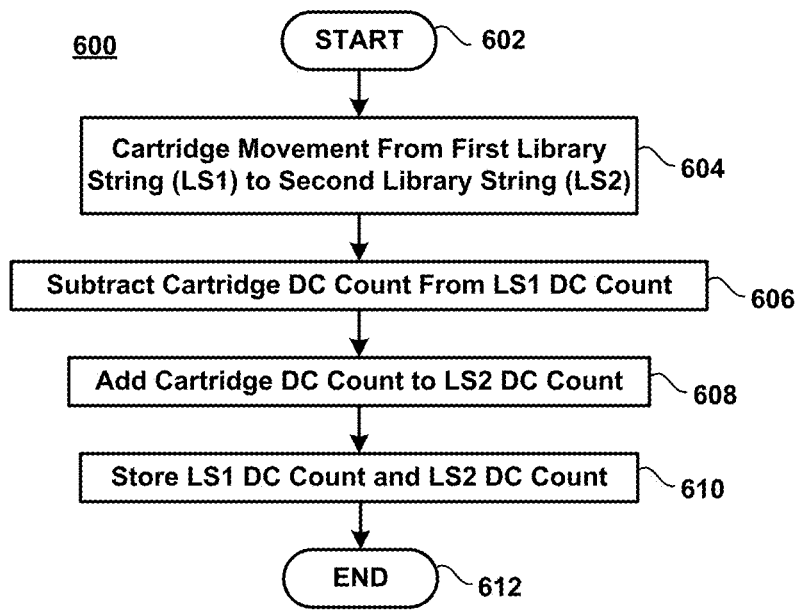
FIG. 8 is a diagram an exemplary method of updating library string data chunk counts upon the movement of a cartridge according to one or more embodiments of the present invention.

FIG. 8 is a diagram an exemplary method 600 of updating library string data chunk counts upon the movement of a cartridge from a movement source string to a movement destination string, according to one or more embodiments of the present invention. Method 600 may be utilized by a processor that evokes program instructions stored in a memory to cause the processor to perform the indicated functionality to update library string data chunk count when the associated cartridge is moved (movement in the Z-axis) within shuttle complex 100.

Method 600 begins at block 602 and continues with moving a cartridge from a movement source string (LS1) to a movement destination string (LS2) (block 604). For example, library manager 50 issues one or more commands to shuttle complex which cause the robotic arm 220 of LS1 to capture the cartridge and place the cartridge into the car within shuttle connection 30 that connects LS1 and LS2, cause the car to move from LS1 to LS2, and cause the robotic arm 220 of LS2 to capture the cartridge from the car and mount the cartridge to a drive 230 within LS2.

Method 600 may continue with subtracting the cartridge data chunk count from the library string data chunk count of the movement source string (block 606). For example, access manager 512 may query the cartridge data chunk data structure associated with the moving cartridge and obtain the current cartridge data chunk count. The access manager 512 may then query the library string data chunk data structure associated with the movement source string, obtain or otherwise determine the current library string data chunk count, and subtract the cartridge data chunk count of the moving cartridge from the library string data chunk count of the movement source string.

Method 600 may continue with adding the cartridge data chunk count to the library string data chunk count of the movement destination string (block 608). For example, access manager 512 may query the cartridge data chunk data structure associated with the moving cartridge and obtain the current cartridge data chunk count. The access manager 512 may then query the library string data chunk data structure associated with the movement destination string, obtain or otherwise determine the current library string data chunk count, and add the cartridge data chunk count of the moving cartridge to the library string data chunk count of the movement destination string.

Method 600 may continue with storing the new respective library string data chunk counts of the movement source string and the movement destination string within a storage device (block 610). For example, access manager 512 may store the updated respective library string data chunk data structures associated with the movement source string and with the movement destination string to memory 802 (see FIG. 10), storage device 825 (see FIG. 10), and/or to the moving cartridge (once mounted). If access manager 512 stores such data structure(s) to memory 802, the data structures may be occasionally stored within a non-volatile storage device, such as storage device 825.

As such, method 600 effectively updates a movement source string library string data chunk data structure and updates a movement destination string library string data chunk data structure when a cartridge is moved from the movement source string to the movement destination string such that the respective library string data chunk counts of the movement source string and the movement destination string accurately reflect the sum of the data chunks written to cartridges located within each library string. Method 600 ends at block 612.

Figure 9:
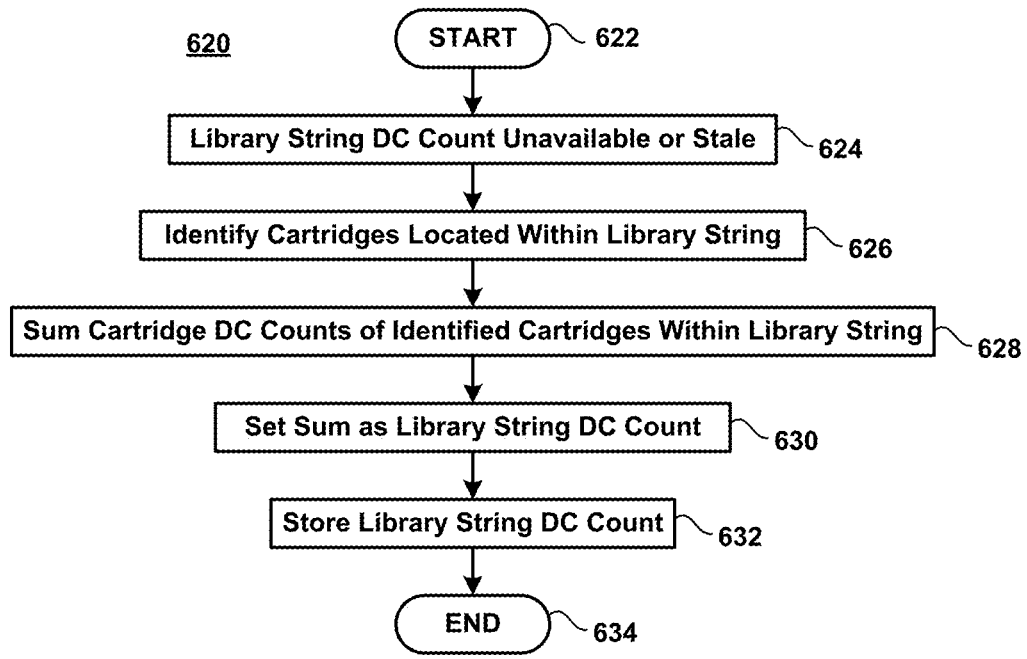
FIG. 9 is a diagram an exemplary method of updating a stale library string data chunk count according to one or more embodiments of the present invention.

FIG. 9 is a diagram an exemplary method 620 of updating a stale or unavailable library string data chunk count, according to one or more embodiments of the present invention. Method 620 may be utilized by a processor that evokes program instructions stored in a memory to cause the processor to perform the indicated functionality to update a stale or unavailable library string data chunk count.

Method 620 begins at block 622 and continues with determining that a library string data chunk count is unavailable or stale (block 624). For example, access manager 512 may query a library string data chunk data structure to determine if an entry exists that indicates the library string data chunk count of the associated library string 10. If this entry does not exist, access manager 512 may effectively determine that library string data chunk count is unavailable. A stale library string data chunk count is a library string data chunk count that has not been queried for accuracy for a predetermined threshold time period. For example, access manager 512 may routinely recalculate each library string data chunk count by summing the cartridge data chunk counts of each cartridge presently located in the library string 10. If such update has not occurred for the predetermined threshold time period, access manager 512 may determine that such library string data chunk count is stale.

Method 620 may continue by identifying all cartridges that presently located within the associated library string 10 (block 626). For example, library manager 50 may identify each cartridge presently located within library string 10. Method 620 may continue with summing the cartridge data chunk counts of each of the identified cartridges within library string 10 (block 628). For example, access manager 512 may query each of the cartridge data chunk data structures associated with the identified cartridges of library string 10, obtain the entry therewithin which indicates the number of data chunks written to each of the identified cartridges, and sum each of the respective numbers of data chunks written to each of the identified cartridges within library string 10.

Method 620 may continue with setting the sum as the library string data chunk count for the library string 10 (block 630). For example, access manager 512 may modify (if needed) the library string data chunk data structure by writing the sum within the entry of this data structure which indicates the sum of the data chunk counts of all the cartridges within the associated library string.

Method 620 may continue with storing the library string data chunk data structure within a storage device (block 632). For example, access manager 512 may store the updated library string data chunk data structure to a memory 802 (see FIG. 10), storage device 825 (see FIG. 10), and/or to a cartridge within library string 10. If access manager 512 stores such data structure(s) to memory 802, the data structures may be occasionally stored within a non-volatile storage device, such as storage device 825. As such, method 620 effectively creates a library string data chunk data structure that may be periodically updated and stored within a storage device accessible to library manager 50. Method 620 ends at block 632.

Figure 10:
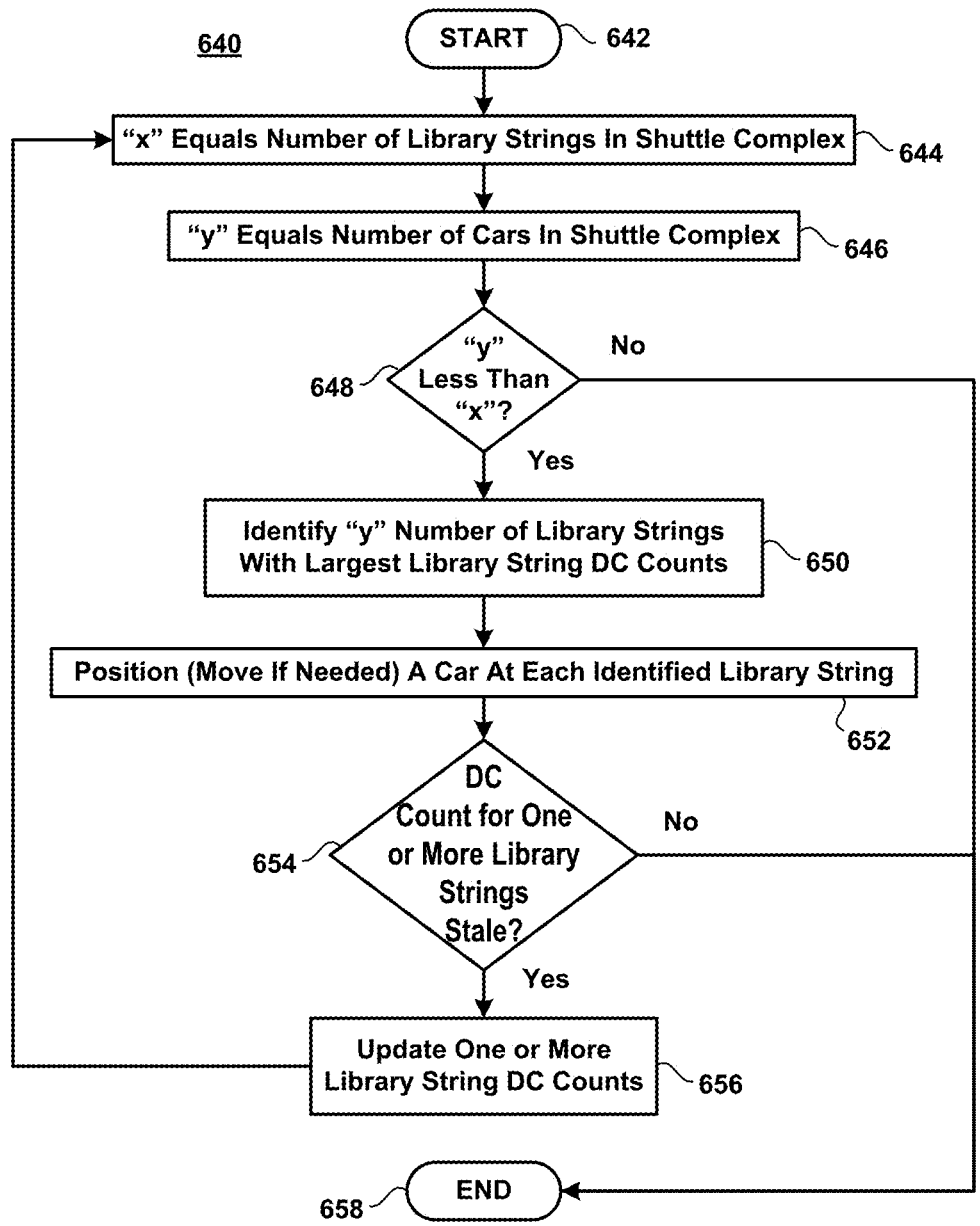
FIG. 10 is a diagram an exemplary method of moving one or more cars within a shuttle connection according to one or more embodiments of the present invention.

FIG. 10 is a diagram an exemplary method 640 of moving one or more cars within a respective shuttle connection 10, according to one or more embodiments of the present invention. Method 640 may be utilized by a processor that evokes program instructions stored in a memory to cause the processor to perform the indicated functionality to move or otherwise position a car within a respective connection 10. Method 640 begins at block 642 and continues with setting variable "x" equal to the number of library strings 30 within shuttle complex 100 (block 644) and setting variable "y" equal to the number of cars within shuttle complex 100. For example, with reference to FIG. 3, library manager 50 may set variable "x" to four (i.e. the number of library strings 30 within shuttle complex 100) and set variable "y" to 3 (i.e. the number of cars within shuttle complex 100).

Method 640 continues if it is determined that the number of cars within shuttle complex 100 is less than the number of library strings within complex 100 (block 648) by identifying "y" number of library strings that have the largest library string data chunk counts (block 650). For example, access manager 512 may determine the library string data chunk count for each of the library strings within shuttle complex 100 by querying each of the library string data chunk data structures for the entry that identifies the number of data chunks written to all of the cartridges within respective library strings 30 within complex 100. Method 640 ends at block 658 if it is determined that the number of cars within shuttle complex 100 is greater than or equal to the number of library strings within complex 100 at block 648.

Method 640 may continue with positioning a respective car at a location within shuttle connection 10 of "y" number of respective library string(s) that have the highest library string data chunk count (block 652). For example, library manager 50 determines whether or not a respective car exists within its shuttle connection 10 at a location of respective library strings 10 that have the highest library string data chunk count. For example, with reference to FIG. 3, library manager 50 may determine that LS1, LS2, and LS4 have the highest library string data chunk count. As such, library manager 50 may determine that car 314 is at the location of LS1 and may determine that car 310 is at the location of LS2 and thus, may effectively determine that the car 314 and the car 310 are already positioned at a location of a library string 10 with the highest library string data chunk counts and as such, car 314 and car 310 need not be moved. Likewise, library manager 50 may determine that car 312 is at the location of LS3 and thus, may effectively determine that car 312 should be moved to the position within SC2 at the location of LS4. Thus, library manager 50 may send one or more commands to move car 312 from LS3 to LS4.

Method 640 may continue by determining whether one or more library string data chunk counts are stale (block 654). For example, a predetermined time threshold is determined (e.g., ten minutes, one day, or the like) that which the library string data chunk count for each library string 10 within shuttle complex 100 should be recalculated. In other implementation, the determining whether one or more library string data chunk counts are stale are completed when library manager 50 writes a predetermined number of data chunks to complex 100. For example, it may be determined whether one or more library string data chunk counts are stale after library manager 50 writes seventy five data chunks, five hundred data chunks, or the like, to one or more of the library strings 10 within complex 100. By intermittently determining whether one or more library string data chunk counts are stale, overly frequent movement of the car(s) within the complex 100 can be avoided.

When it is determined that the one or more library string data chunk counts are stale, the one or more library string data chunk counts are recalculated (block 656) by determining each of the cartridges within the associated library string 10 and summing the cartridge data chunk counts associated therewith. Method 640 may continue from block 656 by returning to block 644. When the time since the last update of a library string data chunk count does not ellipse the predetermined time threshold, method 640 ends at block 658.

Figure 11:
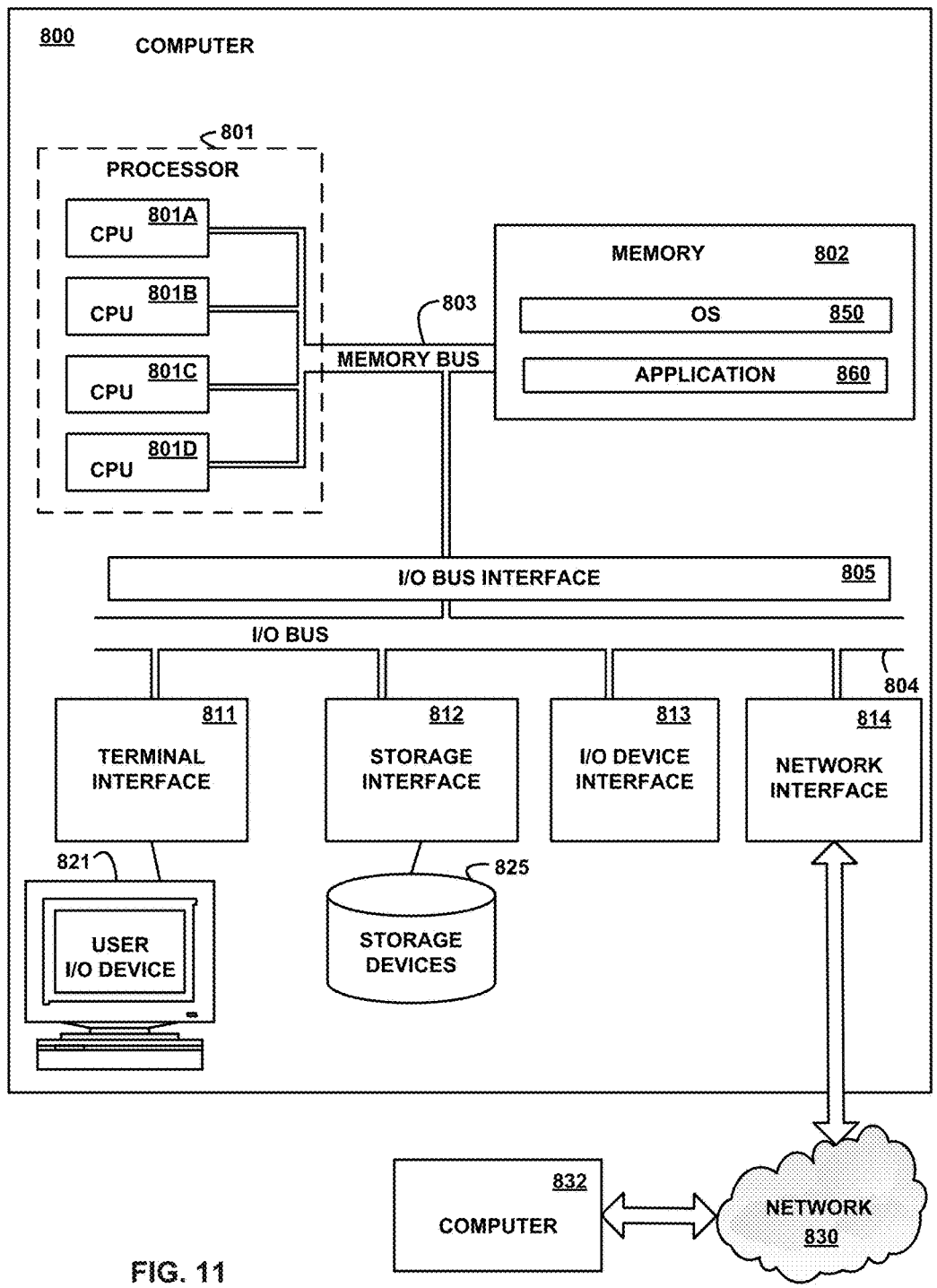
FIG. 11 is a diagram showing an exemplary data handling system which may utilize one or more embodiments of the present invention.

FIG. 11 is a diagram showing an exemplary data handling system which may utilize one or more embodiments of the present invention. More specifically, FIG. 11 depicts a high-level block diagram representation of a computer 800 connected to another computer 832 via a network 830. The term "computer" is used herein for convenience only, and in various embodiments, is a more general electronic data handling devices. The mechanisms and apparatus of embodiments of the present invention apply equally to any appropriate electronic data handling devices.

The major components of the computer 800 may comprise one or more processors 801, a main memory 802, a terminal interface 811, a storage interface 812, an I/O (Input/Output) device interface 813, and a network interface 814, all of which are communicatively coupled, directly or indirectly, for inter-component communication via a memory bus 803, an I/O bus 804, and an I/O bus interface unit 805. The computer 800 contains one or more general-purpose programmable central processing units (CPUs) 801A, 801B, 801C, and 801D, herein generically referred to as the processor 801. In an embodiment, the computer 800 contains multiple processors typical of a relatively large system; however, in another embodiment the computer 800 may alternatively be a single CPU system. Each processor 801 executes instructions stored in the main memory 802 and may comprise one or more levels of on-board cache.

In an embodiment, the main memory 802 may comprise a random-access semiconductor memory, storage device, or other non-tape type storage medium for storing or encoding data and programs. In another embodiment, the main memory 802 represents the entire virtual memory of the computer 800, and may also include the virtual memory of other computer systems coupled to the computer 800 or connected via the network 830. The main memory 802 is conceptually a single monolithic entity, but in other embodiments the main memory 802 is a more complex arrangement, such as a hierarchy of caches and other memory devices. For example, memory 802 may exist in multiple levels of caches, and these caches may be further divided by function, so that one cache holds instructions while another holds non-instruction data, which is used by the processor 801. Memory 802 may be further distributed and associated with different CPUs or sets of CPUs, as is known in any of various so-called non-uniform memory access (NUMA) computer architectures.

The main memory 802 stores or encodes an operating system 850, an application 860, and/or other program instructions. Although the operating system 850, an application 860, etc. are illustrated as being contained within the memory 802 in the computer 800, in other embodiments some or all of them may be on different computer systems and may be accessed remotely, e.g., via a network. The computer 800 may use virtual addressing mechanisms that allow the programs of the computer 800 to behave as if they only have access to a large, single storage entity instead of access to multiple, smaller storage entities. Thus, while operating system 850, application 860, or other program instructions are illustrated as being contained within the main memory 802, these elements are not necessarily all completely contained in the same memory at the same time. Further, although operating system 850, an application 860, other program instructions, etc. are illustrated as being separate entities, in other embodiments some of them, portions of some of them, or all of them may be packaged together.

In an embodiment, operating system 850, application 860, and/or other program instructions comprise instructions or statements that execute on the processor 801 or instructions or statements that are interpreted by instructions or statements that execute on the processor 01, to carry out the functions as further described herein with reference to FIGs. For example, in an embodiment one or more applications 860 may be application 60, library manager 50, access manager 512, or the like. In an embodiment, library manager 50 may be located in computer 800 and application 60 may be located in computer 832.

The memory bus 803 provides a data communication path for transferring data among the processor 801, the main memory 802, and the I/O bus interface unit 805. The I/O bus interface unit 805 is further coupled to the system I/O bus 804 for transferring data to and from the various I/O units. The I/O bus interface unit 805 communicates with multiple I/O interface units 811, 812, 813, and 814, which are also known as I/O processors (IOPs) or I/O adapters (IOAs), through the system I/O bus 804. The I/O interface units support communication with a variety of storage and I/O devices. For example, the terminal interface unit 811 supports the attachment of one or more user I/O devices 821, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 821 and the computer 100, and may receive output data via the user output devices. For example, a user interface may be presented via the user I/O device 821, such as displayed on a display device, played via a speaker, or printed via a printer.

The storage interface unit 812 supports the attachment of one or more storage devices 825. In an embodiment, the storage devices 825 may be rotating magnetic disk drive storage devices, flash storage devices, but in other embodiments they are arrays of disk drives configured to appear as a single large storage device to a host computer, or any other type of storage device. The contents of the main memory 802, or any portion thereof, may be stored to and retrieved from the storage device 825, as needed. The local storage devices 825 have a slower access time than does the memory 802, meaning that the time needed to read and/or write data from/to the memory 802 is less than the time needed to read and/or write data from/to for the local storage devices 825. Similarly, the storage media of the cartridges have a slower access time than does storage devices 825, meaning that the time needed to read and/or write data from/to the storage device 825 is less than the time needed to read and/or write data from/to for the shuttle complex 100.

The I/O device interface unit 813 provides an interface to any of various other input/output devices or devices of other types, such as printers or fax machines. The network interface unit 814 provides one or more communications paths from the computer 100 to other data handling devices such as storage system 832; such paths may comprise, e.g., one or more networks 830. Although the memory bus 803 is shown in FIG. 6 as a relatively simple, single bus structure providing a direct communication path among the processors 801, the main memory 802, and the I/O bus interface 805, in fact the memory bus 803 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 805 and the I/O bus 804 are shown as single respective units, the computer 800 may, in fact, contain multiple I/O bus interface units 805 and/or multiple I/O buses 804. While multiple I/O interface units are shown, which separate the system I/O bus 804 from various communications paths running to the various I/O devices, in other embodiments some or all of the I/O devices are connected directly to one or more system I/O buses.

I/O interface unit 813 and/or network interface 814 may contain electronic components and logic to adapt or convert data of one protocol on I/O bus 804 to another protocol on another bus. Therefore, I/O interface unit 813 and/or network interface 814 may connect a wide variety of devices to computer 800 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc. In a particular embodiment, the computer 800 may be connected to shuttle complex 100 via I/O interface unit 813 and/or network interface 814.

Though shown as distinct entities, the multiple I/O interface units 811, 812, 813, and 814 or the functionality of the I/O interface units 811, 812, 813, and 814 may be integrated into the same component. In various embodiments, the computer 800 is a multi-user mainframe computer system, a single-user system, a storage server, or a server computer or similar device that has little or no direct user interface, but receives requests from other computer systems (clients). In other embodiments, the computer 800 is implemented as a desktop computer, portable computer, laptop or notebook computer, tablet computer, pocket computer, telephone, smart phone, pager, automobile, teleconferencing system, appliance, or any other appropriate type of electronic device.

A communication network 830 may connect the computer 800 to another computer 832 and be any suitable communication network or combination of networks and may support any appropriate protocol suitable for communication of data and/or code to/from the computer 800. In various embodiments, the communication network 830 may represent a data handling device or a combination of data handling devices, either connected directly or indirectly to the computer 800. In another embodiment, the communication network 830 may support wireless communications. In another embodiment, the communication network 830 may support hard-wired communications, such as a telephone line or cable. In another embodiment, the communication network 830 may be the Internet and may support IP (Internet Protocol). In another embodiment, the communication network 830 is implemented as a local area network (LAN) or a wide area network (WAN). In another embodiment, the communication network 830 is implemented as a hotspot service provider network. In another embodiment, the communication network 830 is implemented an intranet. In another embodiment, the communication network 830 is implemented as any appropriate cellular data network, cell-based radio network technology, or wireless network. In another embodiment, the communication network 830 is implemented as any suitable network or combination of networks.

A storage network that may connect the computer 800 with shuttle complex 100 (not shown) is a storage area network (SAN), which is a network which provides access to consolidated, block level data storage. The SAN is generally any high-performance network whose primary purpose is to enable shuttle complex 100 to provide block level storage operations to computer 800. The SAN may be primarily used to enhance storage devices, such as disk arrays, tape libraries, optical jukeboxes, etc., within the storage system to be accessible to computer 800 so that the storage appear to the operating system 850 as locally attached devices. In other words, the storage system may appear to the OS 850 as being storage device 825. A benefit of the SAN is that raw storage is treated as a pool of resources that can be centrally managed and allocated on an as-needed basis. Further, the SAN may be highly scalable because additional storage capacity can be added as required.

The SAN may include may include multiple shuttle complexes 100. Application 860 and/or OS 850 of multiple computers can be connected to multiple shuttle complexes 100 via the SAN. For example, any application 860 and or OS 850 running on each computer can access shared or distinct block level storage within the collective multiple shuttle complexes 100. When computer 800 wants to access a cartridge within shuttle complex 100 via the SAN, computer 800 sends out a block-based access request for the storage device. The SAN may further include cabling, host bus adapters (HBAs), and switches. Each switch on the SAN may be interconnected and the interconnections generally support bandwidth levels that can adequately handle peak data activities. The SAN may be a Fibre Channel SAN, iSCSI SAN, or the like.

FIG. 11 is intended to depict representative major components of the computer 800. Individual components may have greater complexity than represented in FIG. 11, components other than or in addition to those shown in FIG. 11 may be present, and the number, type, and configuration of such components may vary. Several particular examples of such additional complexity or additional variations are disclosed herein; these are by way of example only and are not necessarily the only such variations. The various program instructions implementing e.g. upon computer system 800 according to various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the examples described above, a cartridge that is moved within shuttle connection 30 that was previously mounted in a slot and moved to another library string 10 and mounted in a drive. However, the locations may be reversed such that the cartridge may be moved from a drive via shuttle connection 30 to another library string 10 and placed within a slot. It is also contemplated that one or more cartridges may be moved from a slot via shuttle connection 30 to another library string 10 and placed within a slot and is even further contemplated that one or more cartridge may be moved from a drive via shuttle connection 30 to another library string 10 and placed within a drive.

Embodiments in accordance with the present description were explained with reference to the drawings. However, the present invention is not limited to these embodiments. Cartridge moving in accordance with the present description can be embodied in a manner that includes various improvements, modifications and variations based on the knowledge of those skilled in the art without departing from the scope of the description provided herein.

What is claimed is:

1. A method to move a car within a shuttle connection within a shuttle complex having a plurality of library strings, the shuttle complex including a plurality of cars and the method comprising:

storing a data structure within a storage device comprised within the shuttle complex, wherein the data structure tracks a respective cartridge data chunk count (CDC) of data chunks written to an associated cartridge for each cartridge within the plurality of library strings;

writing data chunks to one or more cartridges within the shuttle complex or moving data chunks from one cartridge to a different cartridge within the shuttle complex;

as a result of writing data chunks or moving data chunks, modifying the data structure by incrementing and or decrementing the cartridge CDC for each cartridge associated with the writing data chunks or moving data chunks;

reading the data structure to determine a library string data chunk count (LSDC) for each of the plurality of library strings, wherein each LSDC is the sum of each CDC of each cartridge comprised within the respective library string;

positioning each of the plurality of cars at different locations within the shuttle complex that correspond with locations of the plurality of library strings with the largest LSDC;

subsequent to positioning each of the plurality of cars, receiving an access request to read one or more data chunks from an access cartridge within an unavailable library string at a particular location comprising a prepositioned car corresponding thereto;

determining that there is not an available drive within the unavailable library string to read from the access cartridge; and moving the access cartridge in the prepositioned car from the unavailable library string to an available library string comprising a drive with availability to read from the access cartridge.

2. The method of claim 1, further comprising:

determining a number of library strings within the shuttle complex; and determining a number of cars within the shuttle complex.

3. The method of claim 1, wherein each library string comprises a plurality of first media slots and a robotic arm that is configured to transport each cartridge within the the library string.

4. A computer program product for use with a shuttle complex having a plurality of shuttle connections, each shuttle connection comprising a car able to move within the shuttle connection, a plurality of library strings connected by at least one shuttle connection, each library string comprising at least one cartridge, the shuttle complex having a processor comprising the computer program product having a computer readable storage medium including program instructions that when executed by the processor, causes the shuttle complex to:

store a data structure within the storage, wherein the data structure tracks a respective cartridge data chunk count (CDC) of data chunks written to an associated cartridge for each cartridge within the plurality of library strings;

write data chunks to one or more cartridges within the shuttle complex or moving data chunks from one cartridge to a different cartridge within the shuttle complex;

as a result of writing data chunks or moving data chunks, modify the data structure by incrementing and or decrementing the cartridge CDC for each cartridge associated with the writing data chunks or moving data chunks;

read the data structure to determine a library string data chunk count (LSDC) for each of the plurality of library strings, wherein each LSDC is the sum of each CDC of each cartridge comprised within the respective library string;

position each of the plurality of cars at different locations within the shuttle complex that correspond with locations of the plurality of library strings with the largest LSDC;

subsequent to positioning each of the plurality of cars, receive an access request to read one or more data chunks from an access cartridge within an unavailable library string at a particular location comprising a prepositioned car corresponding thereto;

determine that there is not an available drive within the unavailable library string to read from the access cartridge; and move the access cartridge in the prepositioned car from the unavailable library string to an available library string comprising a drive with availability to read from the access cartridge.

5. The computer program product of claim 4, wherein the program instructions that when executed by the processor, further cause the shuttle complex to:

determine a number of library strings within the shuttle complex; and determine a number of cars within the shuttle complex.

6. The computer program product of claim 4, wherein each library string further comprises a plurality of media slots and a robotic arm that is configured to transport each cartridge within the first library string.

7. A system, comprising:

a shuttle complex comprising a plurality of shuttle connections, each shuttle connection comprising a car able to move within the shuttle connection, a plurality of library strings connected by at least one shuttle connection, each library string comprising at least one cartridge including a storage medium, the shuttle complex further comprising a processor comprising a storage including program instructions that when executed by the processor, causes the shuttle complex to:

store a data structure within the storage, wherein the data structure tracks a respective cartridge data chunk count (CDC) of data chunks written to an associated cartridge for each cartridge within the plurality of library strings;

write data chunks to one or more cartridges within the shuttle complex or moving data chunks from one cartridge to a different cartridge within the shuttle complex;

as a result of writing data chunks or moving data chunks, modify the data structure by incrementing and or decrementing the cartridge CDC for each cartridge associated with the writing data chunks or moving data chunks;

read the data structure to determine a first library string data chunk count (LSDC) for each of the plurality of library strings, wherein each LSDC is the sum of each CDC of each cartridge comprised within the respective library string;

position each of the plurality of cars at different locations within the shuttle complex that correspond with locations of the plurality of library strings with the largest LSDC;

subsequent to positioning each of the plurality of cars, receive an access request to read one or more data chunks from an access cartridge within an unavailable library string at a particular location comprising a prepositioned car corresponding thereto;

determine that there is not an available drive within the unavailable library string to read from the access cartridge; and move the access cartridge in the prepositioned car from the unavailable library string to an available library string comprising a drive with availability to read from the access cartridge.

* * * * *